United States Patent [19]
Newcomer

[11] 3,829,129
[45] Aug. 13, 1974

[54] TRAILER HITCH
[75] Inventor: Keith E. Newcomer, La Grange, Ind.
[73] Assignee: W. R. Grace & Co., New York, N.Y.
[22] Filed: Dec. 7, 1972
[21] Appl. No.: 313,086

[52] U.S. Cl............................................ 280/476 R
[51] Int. Cl............................................ B60d 7/00
[58] Field of Search ....... 280/476, 423 A, 415, 418, 280/408, 425, 440

[56] References Cited
UNITED STATES PATENTS
| | | | |
|---|---|---|---|
| 3,252,714 | 5/1966 | Chieger et al. | 280/408 X |
| 3,482,853 | 12/1969 | Raidel | 280/476 R X |
| 3,486,768 | 12/1969 | Masser | 280/476 R |

FOREIGN PATENTS OR APPLICATIONS
| | | | |
|---|---|---|---|
| 303,942 | 9/1968 | Sweden | 280/423 A |
| 215,401 | 12/1957 | Australia | 280/476 R |

*Primary Examiner*—Leo Friaglia
*Assistant Examiner*—Randall A. Schrecengost
*Attorney, Agent, or Firm*—Charles L. Harness, Esq.

[57] ABSTRACT

This fifth wheel hitch adapter allows a fifth wheel type trailer to be hauled by an ordinary truck equipped with a ball-hitch or pintle. Two frame members are fastened to the axle adjacent its ends, and, considerably forwardly of the axle, converge to an apex on which the actual towing head is mounted. The fifth wheel is mounted on a plate suspended on springs held in position by a framework mounted in advance of the axle. Positioning of trailers or light hauling can be accomplished by the use of this adaptor, thus freeing the trailer tractor for more profitable operation.

3 Claims, 4 Drawing Figures

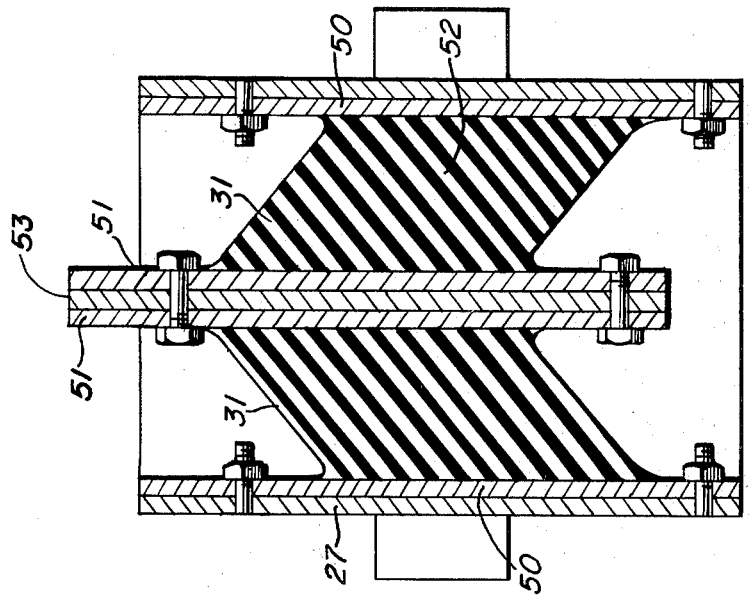
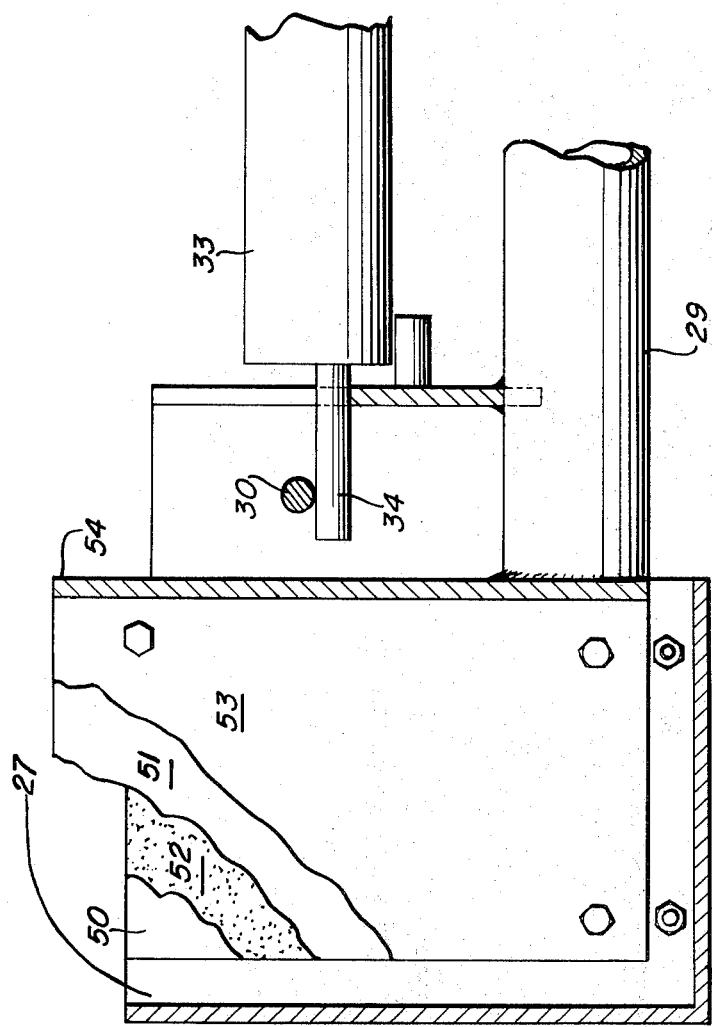

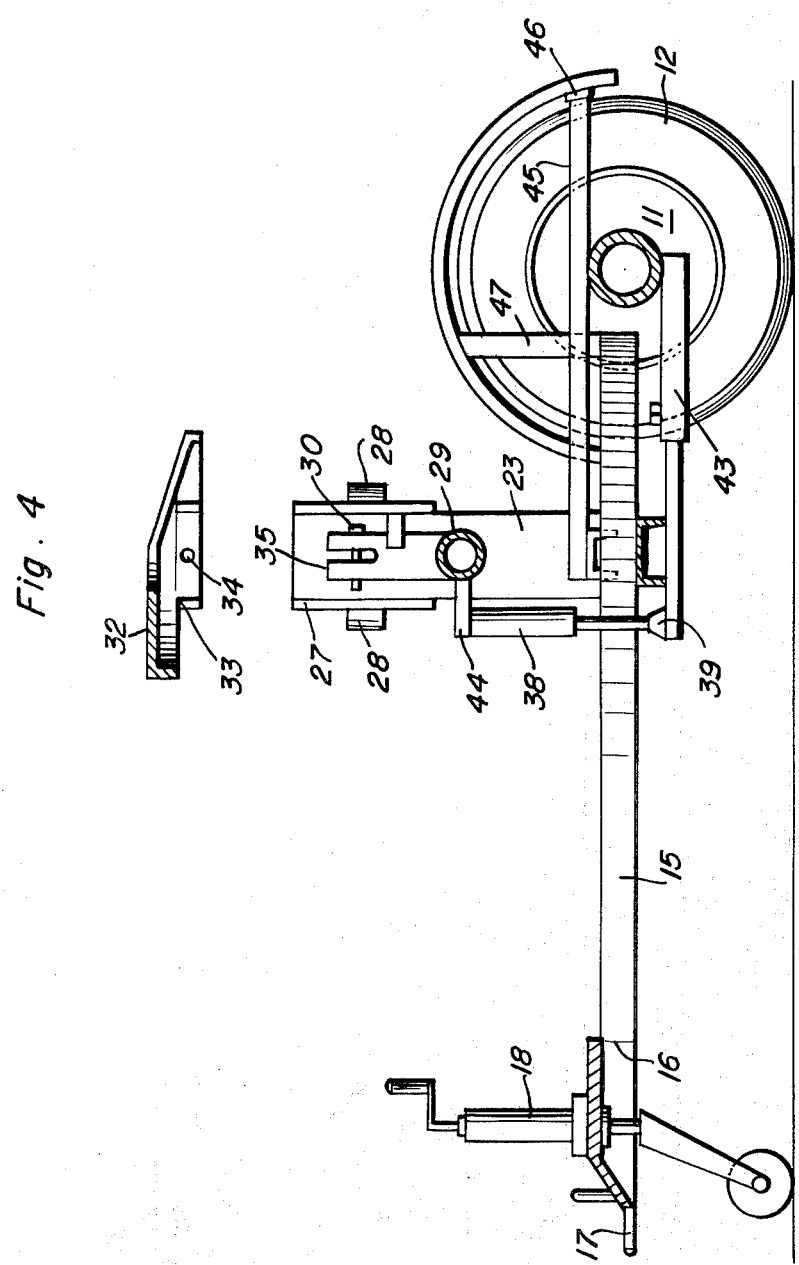

TRAILER HITCH

This invention relates to the fifth wheel adaptor which permits a fifth wheel trailer to be hauled by a truck, yard tractor, or other motorized means if it is equipped with a ball- or pintle hitch.

There are many times when it is desirable to pull a fifth wheel type trailer, i.e., spotting trailers against loading platforms, when a fifth wheel type trailer tractor is not available. The adaptor permits a fifth wheel type trailer body to be moved around storage yards, loading platforms, and other short-distance moves. Its use avoids tying up expensive fifth wheel type trailer tractors for such duties when the machine can much better be employed in road hauling.

FIG. 2 shows a cross-section of the suspension, taken along the line 2,2, in the direction of the arrows.

FIG. 3 is a similar cross-sectional view, simply of the suspension box per se, taken along the line 3,3, in the direction of the arrows.

FIG. 4 is a sectional view of the overall fifth wheel mechanism, taken through the center along the line 4,4, in the direction of the arrows.

Figure 1:
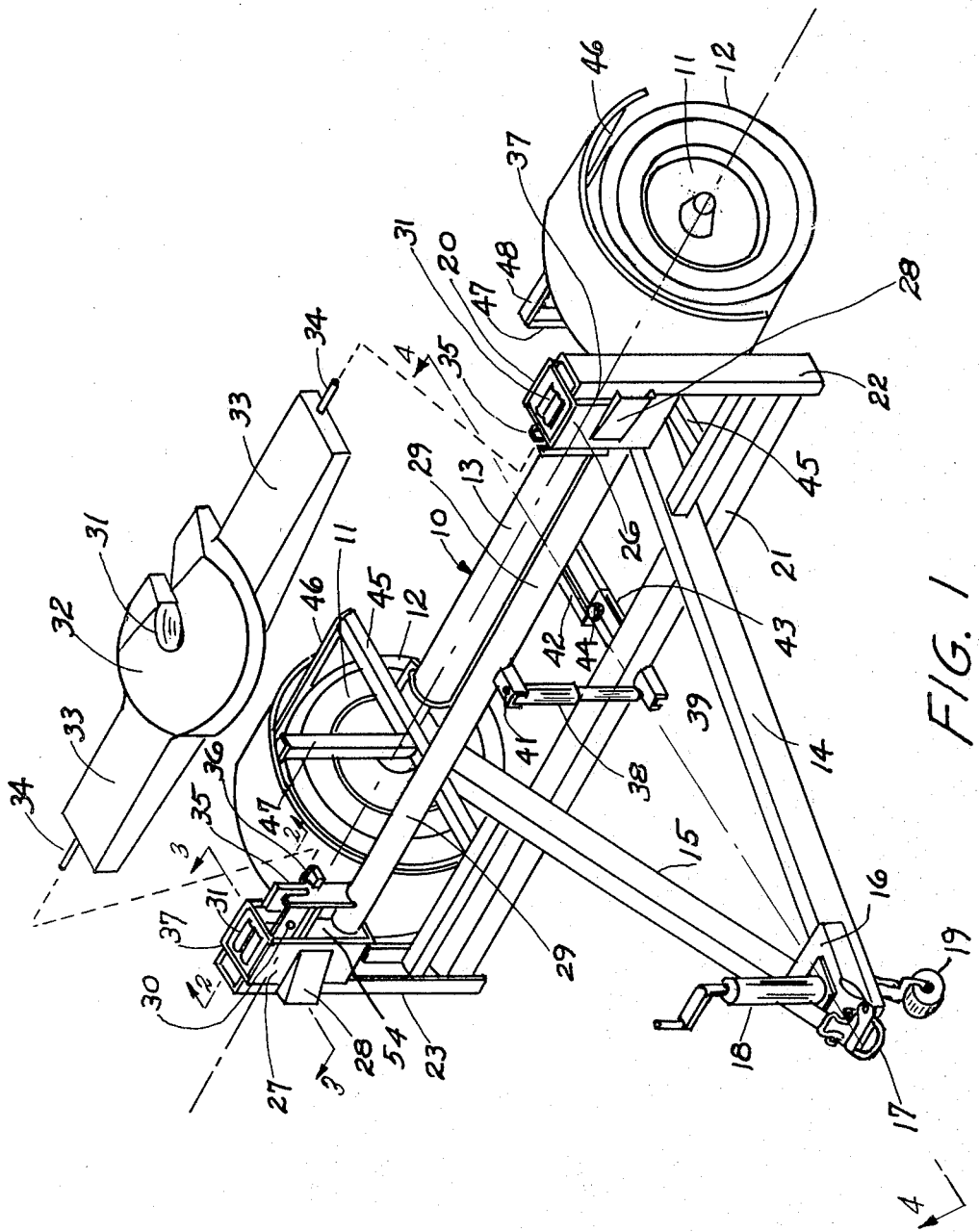
FIG. 1 shows the adaptor in perspective.

The adaptor is shown in perspective view in FIG. 1. As the figure shows, the adaptor, generally indicated by 10, comprises a pair of wheels, 11—11, equipped with pneumatic tires, 12—12. The wheels are joined by the trailing axle, 13, and rotate about spindles (not shown) formed on each end of the axle.

Two frame members, 14-15, respectively joined to the axle, 13, adjacent its ends, extend forwardly to meet substantially on the center line of the adaptor, and not only are fastened together in an appropriate manner as by welding, but are reinforced by a gusset, 16, welded or otherwise fastened to the frame members, 14 and 15.

The actual hitch, 17, may be the hood portion of a conventional ball hitch, or it may be the loop hitch as is shown on the drawing which conveniently may be latched about the shank of the ball, or dropped into the pintle hook of the towing vehicle.

A jack and leveling stand, 18, projects through the gusset, 16, and makes it possible to level the trailer body or to retract the caster wheel, 19, when the adaptor with its load is to be moved.

The upper ends of the upright channels, 22 and 23, carry spring boxes, 26 and 27, rigidly fastened to the channels. Their fastenings or welds are reinforced by the gussets, 28—28. The ends of a horizontal tie bar, 29, float on springs, 31—31, housed in the spring boxes, 26 and 27. The fifth wheel, 32, is conventional. Its two arms, 33—33, terminate as is usual in the pins, 34—34, which are supported when the fifth wheel, 32, is in place by engagement in the forked holders, 35—35, which are rigidly fastened to the horizontal tie bar, 29, adjacent each end. Stops, 36—36, welded to the holders, 35, prevent the fifth wheel, 32, from flopping too far out of place.

The pins, 34—34, are prevented from jumping out of the holders, 35—35, by inserting locking pins through the apertures, 30, formed in the horizontal portions of the fork holders, 35—35. Accordingly, when either of the pins, 34, attempts to lift, it is restrained by the locking pin which then passes through and occupies the aperture, 30.

Horizontal tie bar, 29, cannot move appreciably longitudinally since its ends then would bring up on the back walls, 37—37, of the spring boxes, 26 and 27.

The springs, 31—31, which support the horizontal tie bar, 29, may be any type of compression spring stiff enough to accept the load, but I find it preferable to use rubber springs, particularly springs of the "MOR/RYDE" type which are commercially available. ("MOR/RYDE" is a registered trademark of MOR/RYDE, Elkhart, Ind.) These not only support the load well, but in conjunction with the shock absorber, 38, which extends between the channel, 21, and the tie bar, 29, damp out the jitter which is characteristic of a metallic spring mount.

The shock absorber, 38, which extends between the two stubs, 39 and 41, welded respectively to tie bar, 29, and channel, 21, and placed substantially on the center line of the adaptor not only checks road shock but prevents the axle from twisting, because channel, 42, which is welded to the axle, 13, and extends forwardly is bolted to a like but preferably interfitting channel, 43, which extends rearwardly from the channel, 21. The two channels are coupled by an appropriate fastening — in this case the bolt, 44.

Struts, 45—45, fastened to the channel, 21, and also fastened closely adjacent the rear ends of the frame members, 14 and 15, carry the fender support rigging, 46—46. Struts, 47—47, extending upwardly from the rearward struts, 45—45, are attached to the upper members, 48—48, of the fender rigging, 46.

FIG. 3 shows the suspension box in a relaxed or unloaded condition. It will be noted that the box comprises a pair of suspension elements, bolted not only to the outer shell 27, but also to themselves via junction plate 53. Each element of the pair consists of outer plates 50, inner plates 51, and these plates are bonded together by a rubber spring 52. Junction plate, shown in section in FIG. 3, and in elevation in FIG. 2, is welded perpendicularly to tiebar faceplate 54.

The weight of the trailer is thus transmitted to the wheels via fifth wheel 32, thence to tiebar faceplate 54, then to junction plate 53, then through rubber masses 31,31, thence to the shells of spring boxes 26 and 27, then to channels 22 and 23, and finally to frame members 14 and 15. Road unevenness is obviously transmitted from the wheels to the fifth wheel in the reverse sense.

In use, this adaptor is backed by a truck against the elevated forward end of a trailer equipped with a fifth wheel hitch. Backing as is conventional continues until the trailer center pin locks into the central hole of the fifth wheel, 31. The fifth wheel lock (conventional and not shown on the drawing) is then pushed home and the forward end of the trailer is lowered to be supported entirely upon the hitch adaptor. The trailer can be now moved as is desired.

For spotting trailers at a loading platform, placing them in a park or on display, this towing hitch adaptor is an inexpensive and effective substitute for an over-the-road hauler, and frees these expensive tractors for more profitable operations.

I claim:

1. A hitch adaptor for fifth wheel trailer units comprising a. a trailing axle having a wheel mounted on each of its ends, b. frame members having their rear ends attached to the said trailing axle and converging to meet on the center line of the said adaptor,
c. a gusset fastened to the said frame members at their apex, towing hitch means fastened to said gusset and frame members,
d. a jack and leveling stand projecting through the said gusset,
e. a transverse frame member fastened to both converging frame members,
f. vertically disposed frame members attached at each end of the said transverse member,
g. spring boxes fastened to the said vertical frame members adjacent their upper ends,
h. suspension springs in each of the said spring boxes,
i. a cross tie bar supported on the said springs,
j. means to support and retain a fifth wheel assembly comprising vertically positioned forked holders adapted to receive the end pins of the said assembly,
k. shock absorbing means extending between the said cross tie bar and the transverse frame member, and
l. means to prevent the rotational displacement of the said axle with respect to the said transverse frame member, comprising channel members coupling the said axle to the said transverse frame member.

2. An adaptor as claimed in claim 1 wherein rotation of the said cross tie bar is prevented by a shock absorber fastened substantially on the center line of the said adaptor between the cross tie bar and the transverse frame member.

3. An adaptor as claimed in claim 1 having fenders supported by fender riggings, in turn supported by struts fastened to and extending between the said transverse frame member and the axle.

* * * * *